United States Patent
Desprez

(10) Patent No.: US 8,126,204 B2
(45) Date of Patent: Feb. 28, 2012

(54) METHOD OF PROCESSING MAILPIECES, THE METHOD INCLUDING GRAPHICALLY CLASSIFYING SIGNATURES ASSOCIATED WITH THE MAILPIECES

(75) Inventor: Olivier Desprez, Versailles (FR)

(73) Assignee: Solystic, Gentilly Cedex (FR)

( * ) Notice: Subject to any disclaimer, the term of this patent is extended or adjusted under 35 U.S.C. 154(b) by 751 days.

(21) Appl. No.: 12/282,438

(22) PCT Filed: May 22, 2008

(86) PCT No.: PCT/FR2008/050885
§ 371 (c)(1),
(2), (4) Date: Sep. 10, 2008

(87) PCT Pub. No.: WO2008/152277
PCT Pub. Date: Dec. 18, 2008

(65) Prior Publication Data
US 2010/0232642 A1    Sep. 16, 2010

(30) Foreign Application Priority Data
May 30, 2007  (FR) .................................... 07 55342

(51) Int. Cl.
*G06K 9/00* (2006.01)

(52) U.S. Cl. ....................................... 382/101; 382/282
(58) Field of Classification Search .................. None
See application file for complete search history.

(56) References Cited

U.S. PATENT DOCUMENTS

| | | | | |
|---|---|---|---|---|
| 6,360,001 B1 * | 3/2002 | Berger et al. | ................. | 382/101 |
| 7,356,162 B2 * | 4/2008 | Caillon | ................. | 382/101 |
| 2005/0249376 A1 * | 11/2005 | Leo et al. | ................. | 382/101 |

FOREIGN PATENT DOCUMENTS

| | | |
|---|---|---|
| DE | 202 18 212 U1 | 12/2003 |
| FR | 2 883 493 A | 9/2006 |

* cited by examiner

*Primary Examiner* — Jason M Repko
*Assistant Examiner* — Siamak Harandi
(74) *Attorney, Agent, or Firm* — Rothwell, Figg, Ernst & Manbeck, P.C.

(57) ABSTRACT

In a method of processing mailpieces, signatures are derived from images of the mailpieces and serve as identifiers for the mailpieces in the sorting process. The signatures are grouped together into signature categories or graphical classes on the basis of a certain criterion of graphical similitude so as to compute a mean signature value for each graphical class. For each graphical class in question, activity of the mean signature value is analyzed for detecting significant activity of an information block in the digital images. The results of this activity detection are used for searching for a match, in a second sorting pass, between a current signature and signatures recorded in the first sorting pass.

5 Claims, 9 Drawing Sheets

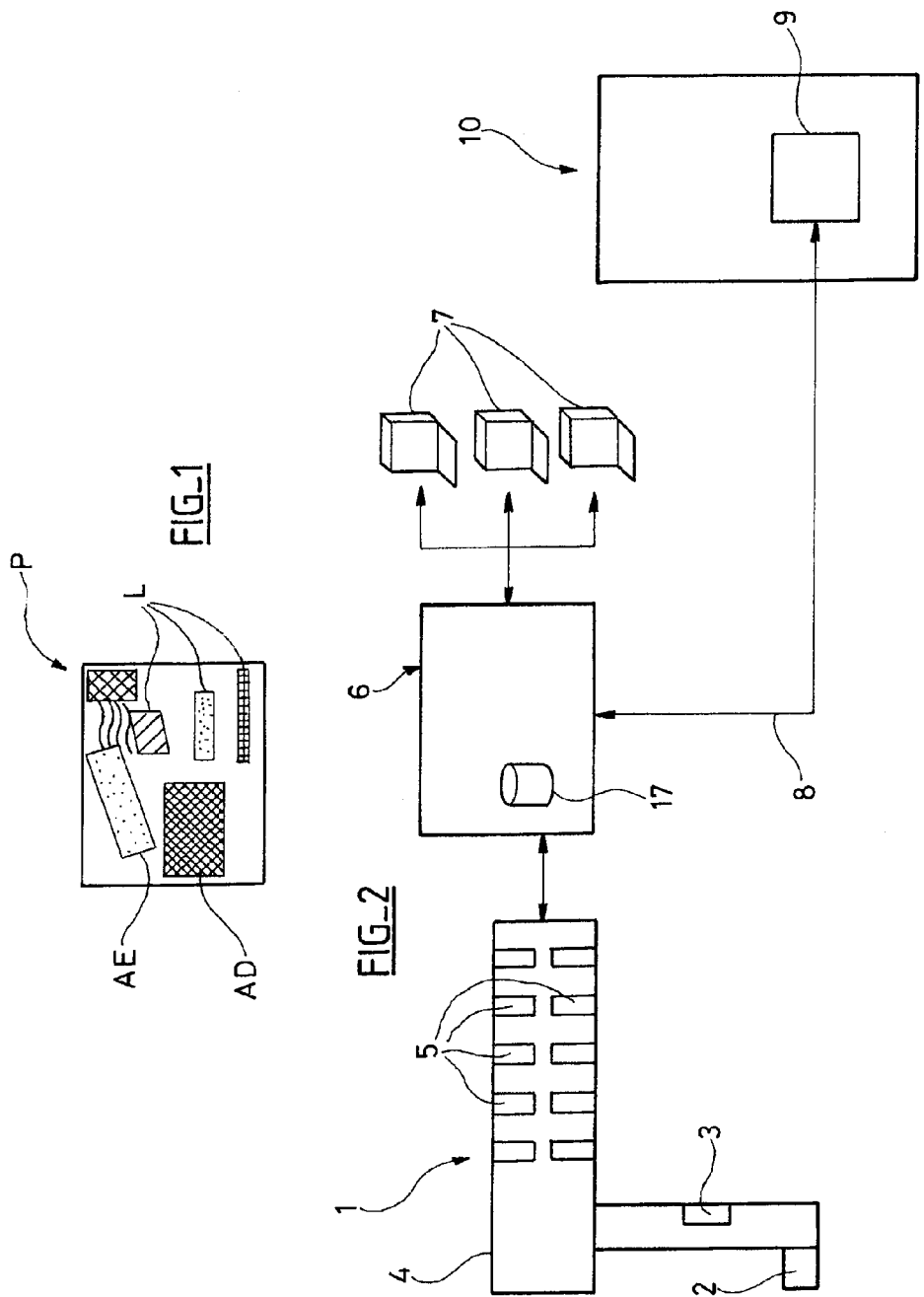

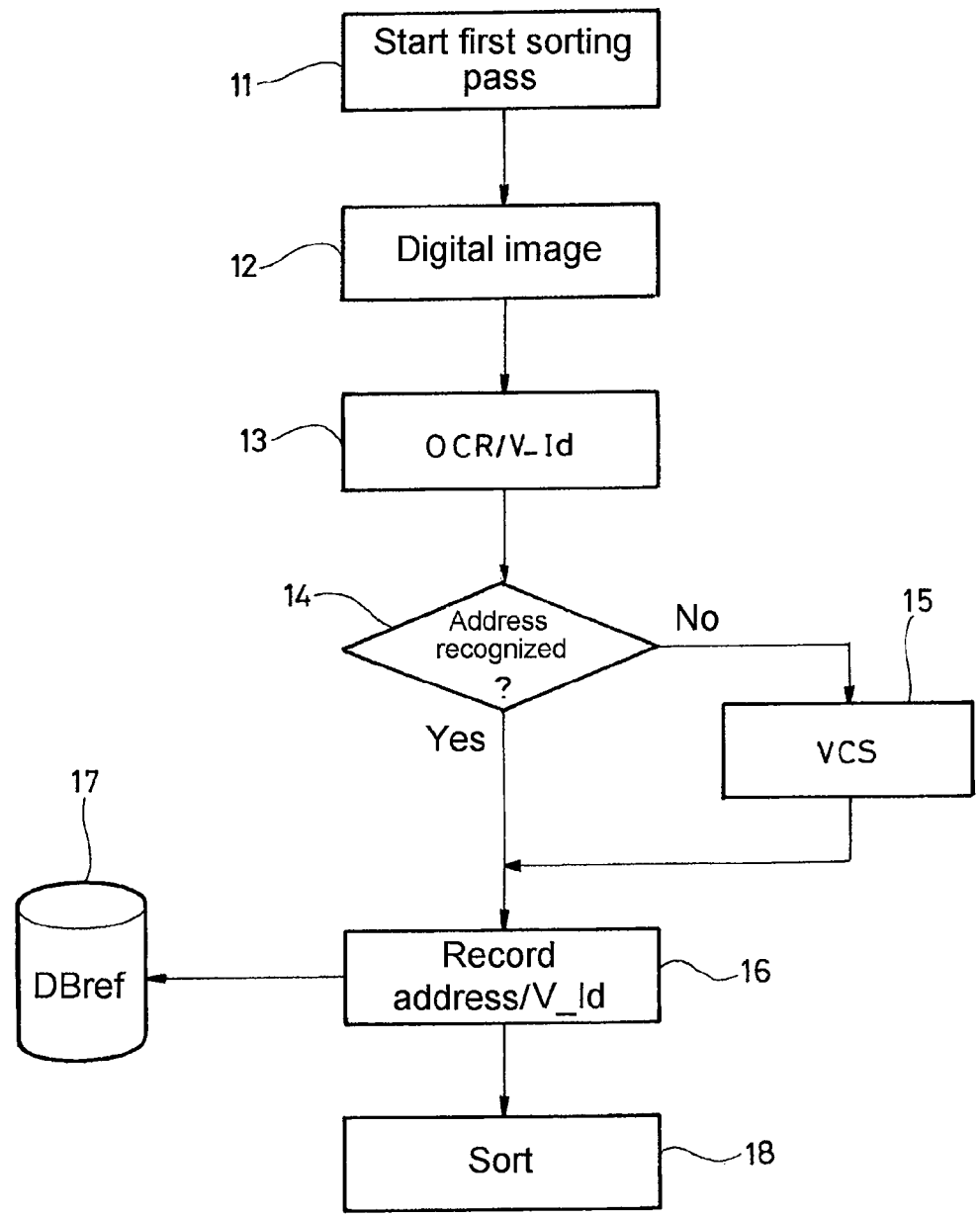
FIG_3

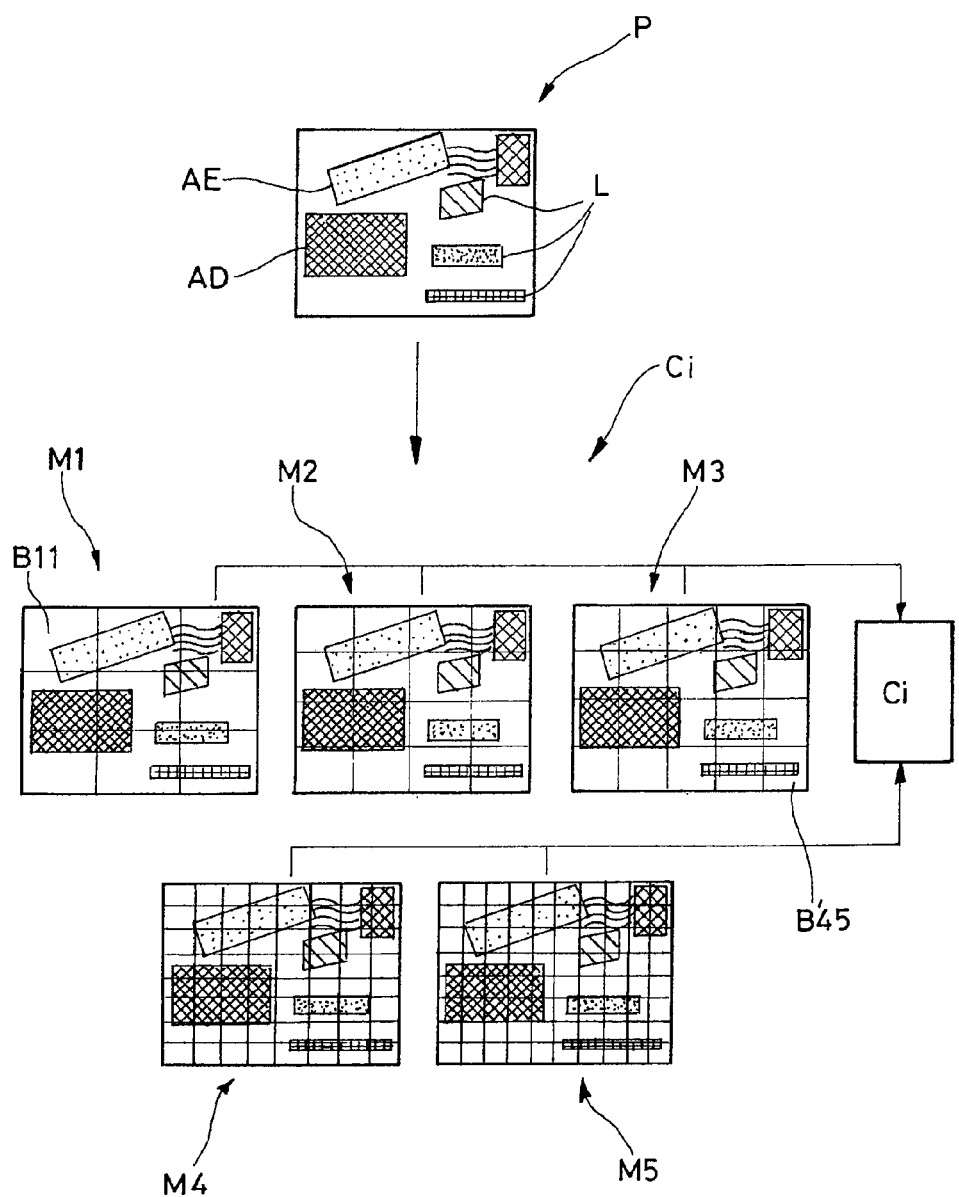

FIG_5
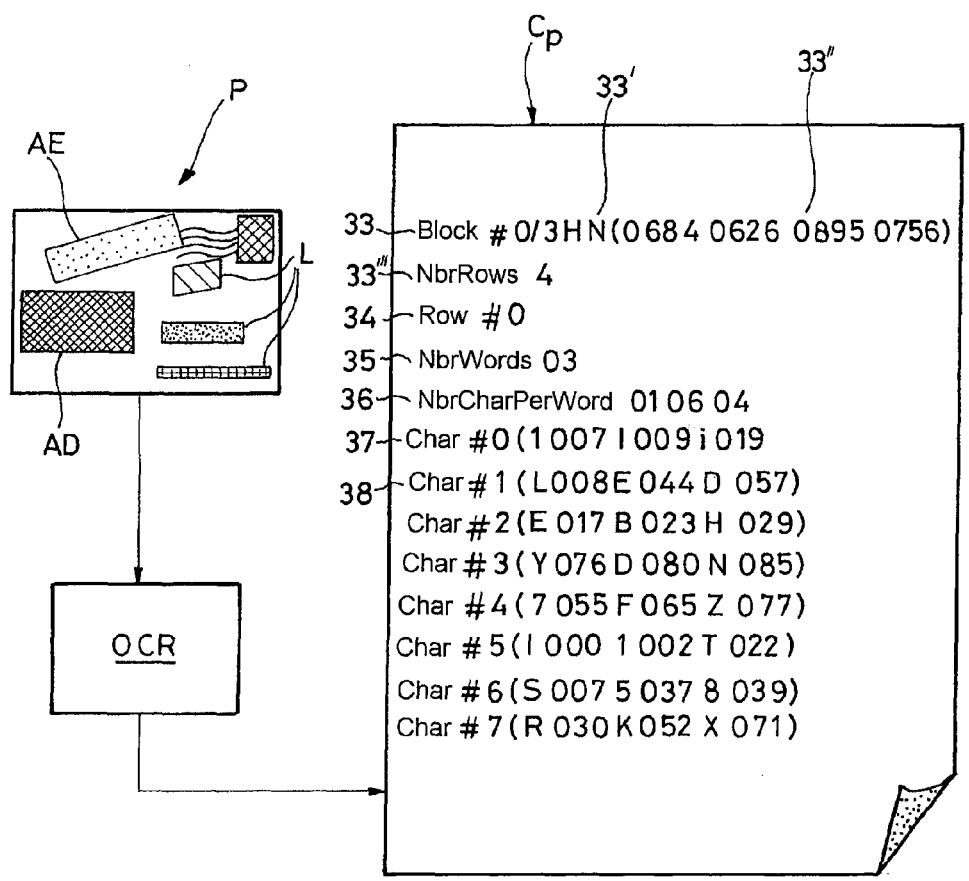

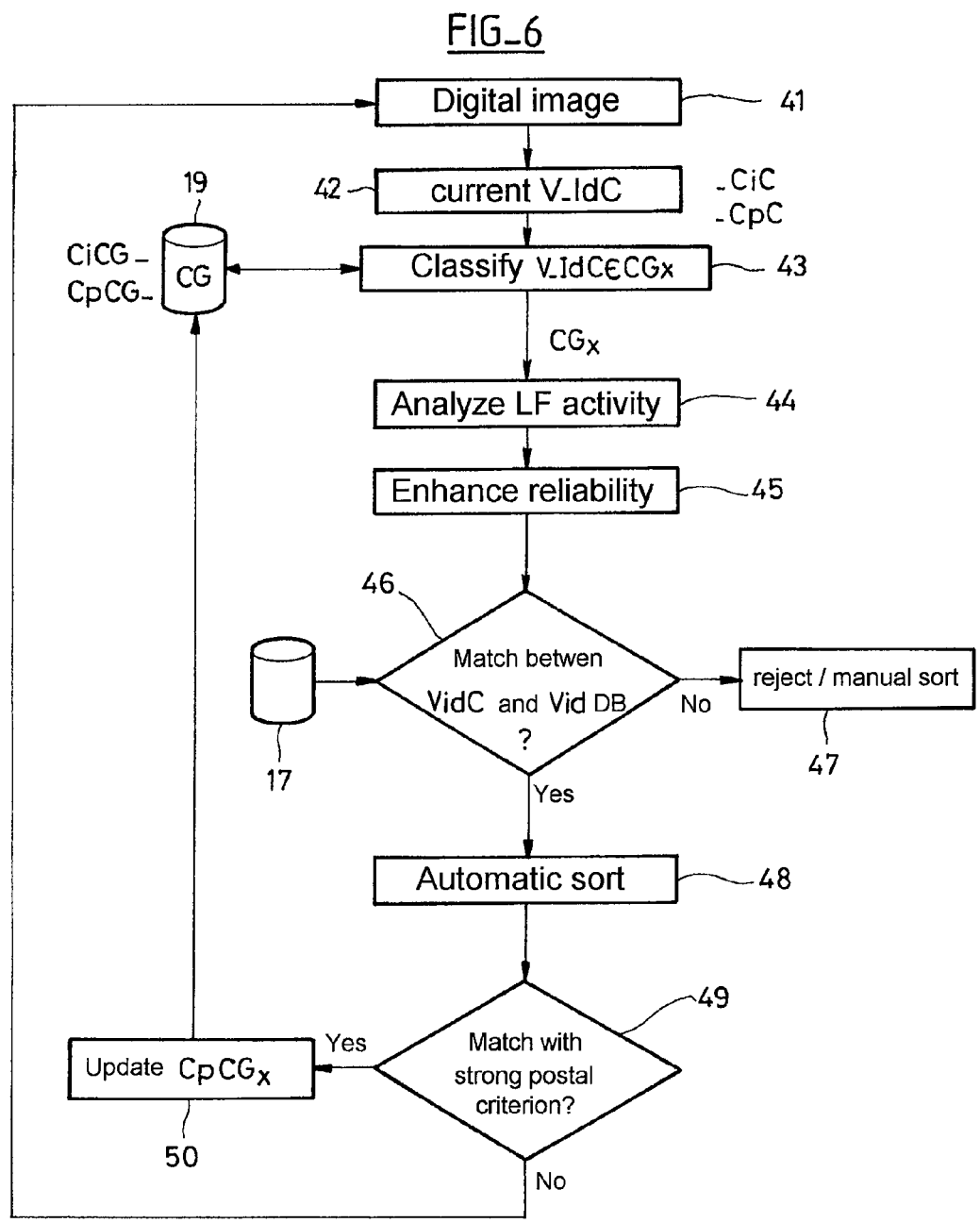

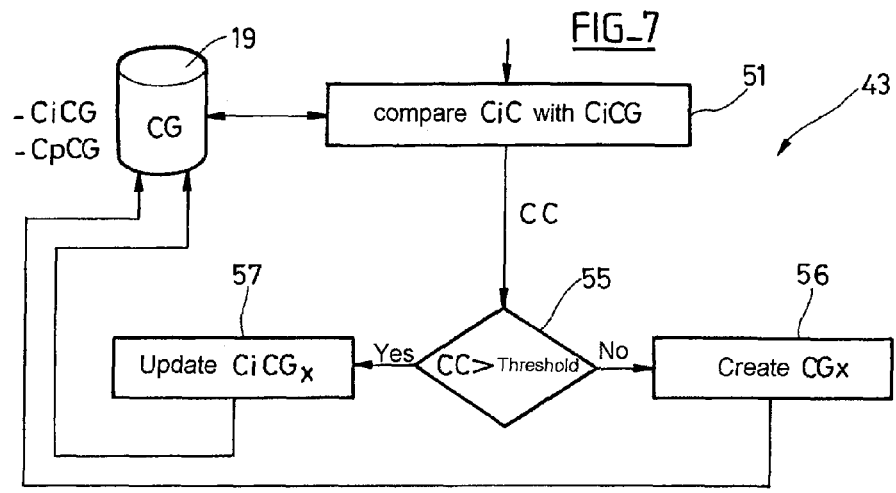
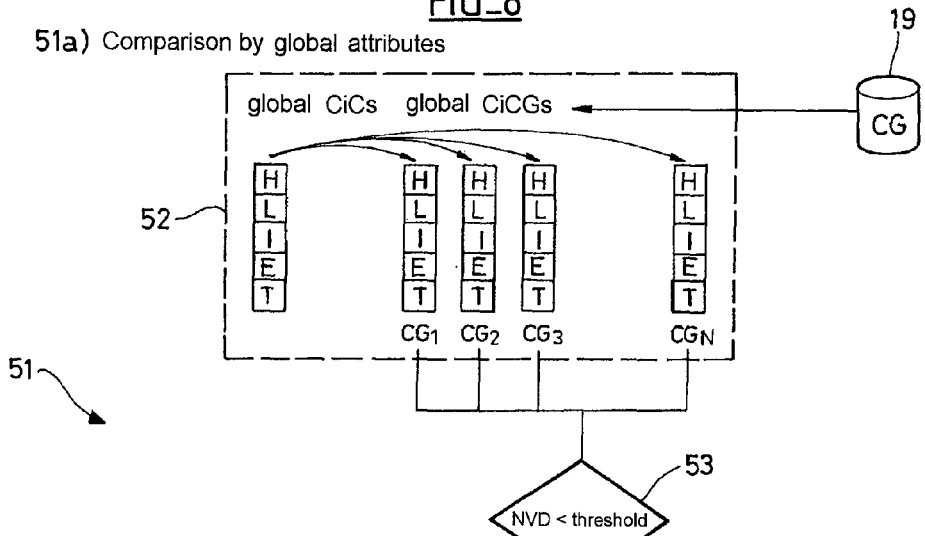
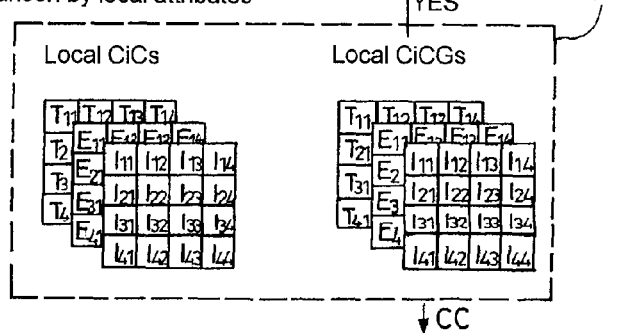

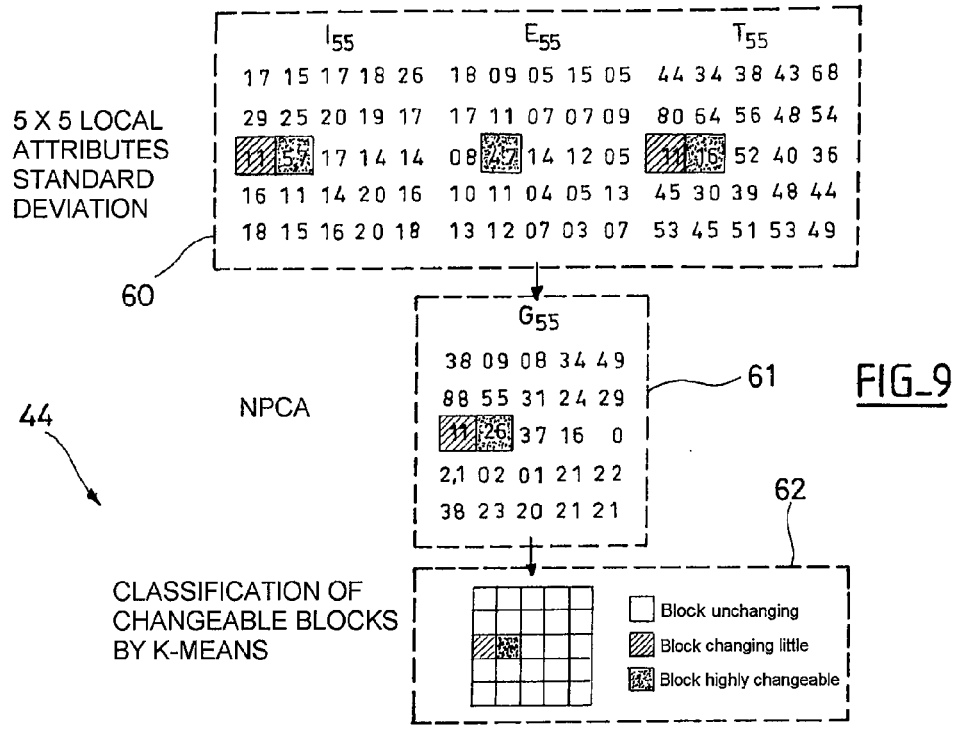
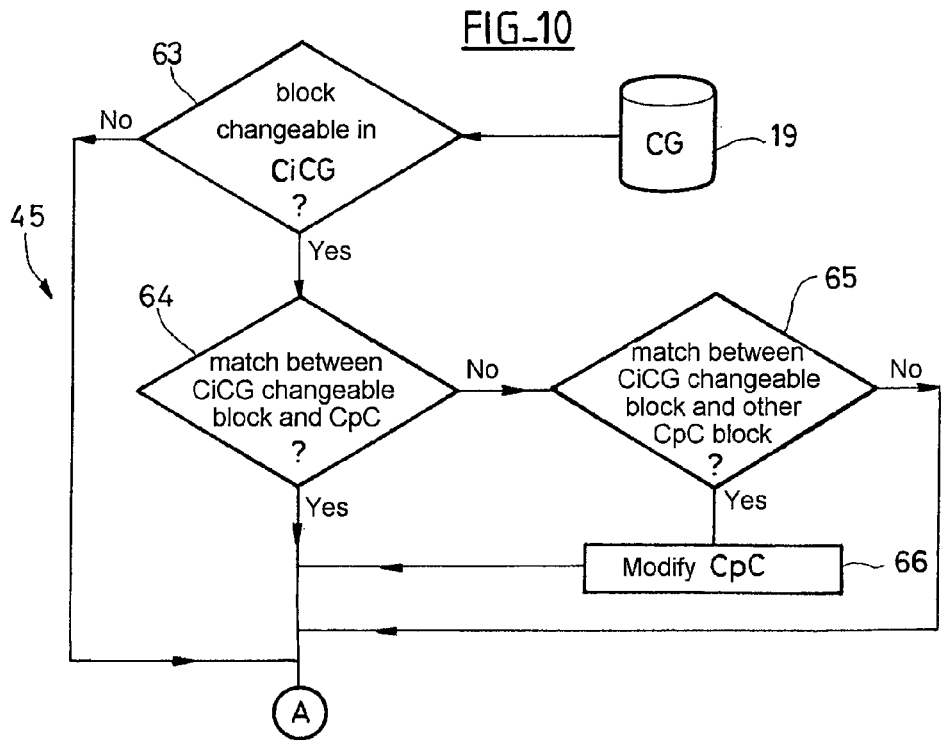

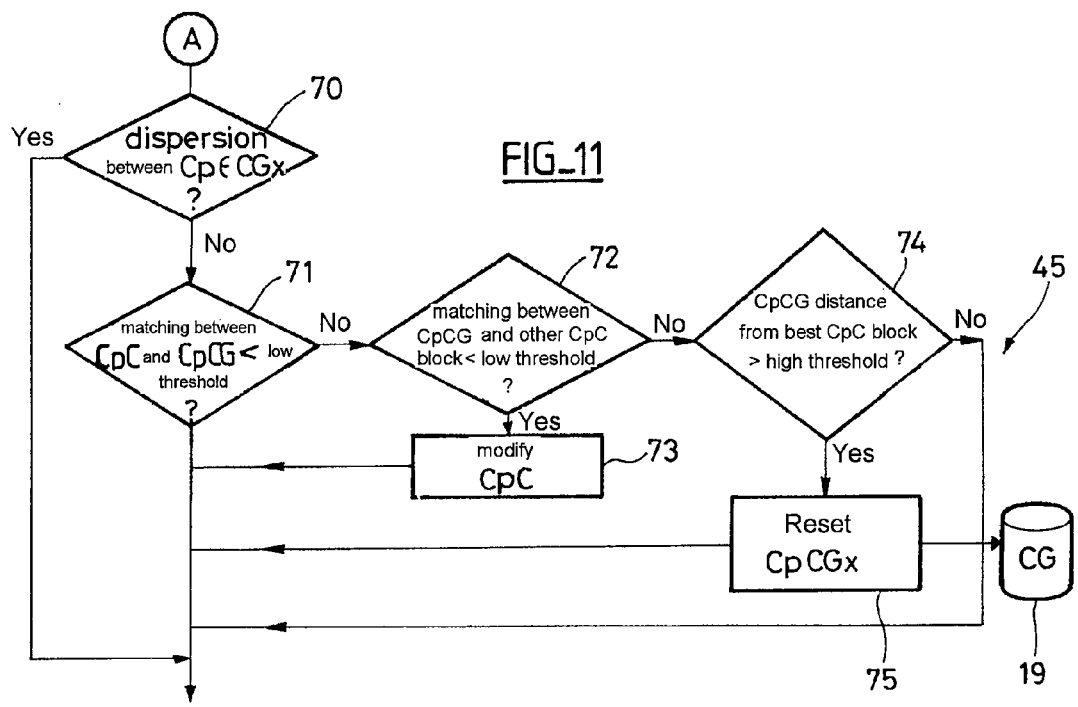
FIG_11
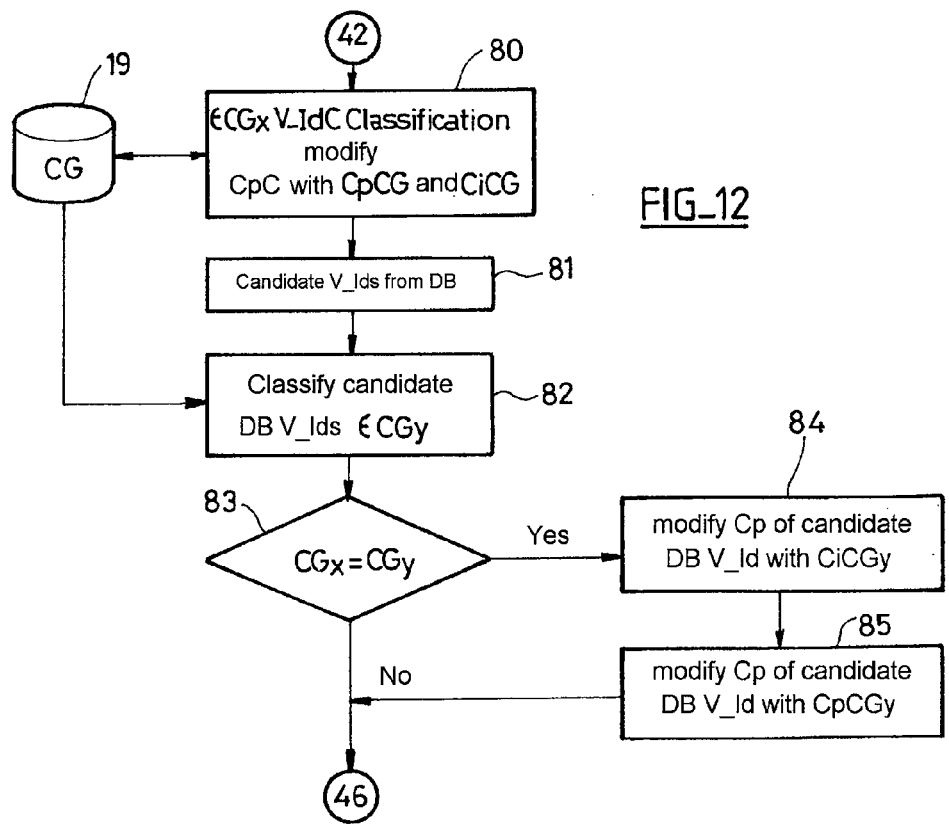
FIG_12

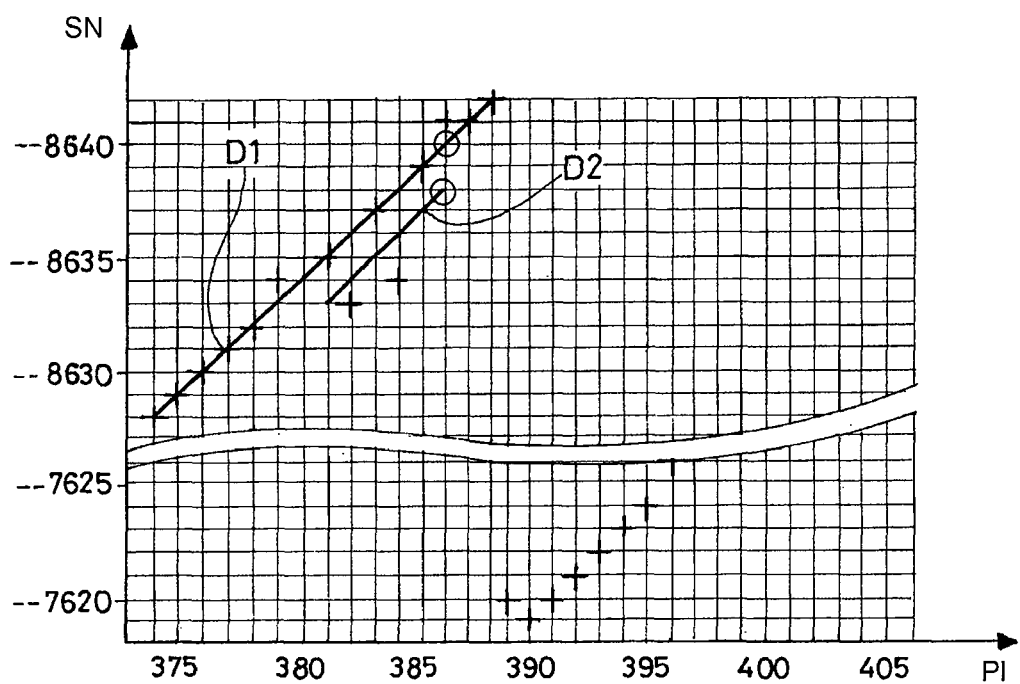
FIG_13

METHOD OF PROCESSING MAILPIECES, THE METHOD INCLUDING GRAPHICALLY CLASSIFYING SIGNATURES ASSOCIATED WITH THE MAILPIECES

CROSS-REFERENCE TO RELATED APPLICATIONS

This application is a 35 U.S.C. §371 National Phase Application from PCT/FR2008/050885, filed May 22, 2008, and designating the United States, which claims the benefit of France Patent Application No. 0755342, filed May 30, 2007.

BACKGROUND OF THE INVENTION

1. Field of the Invention

The invention relates to a method of processing mailpieces, which method, during a first mailpiece sorting pass, comprises forming a digital image of the surface of each mailpiece that bears information blocks, in deriving a digital signature as a kind of graphical fingerprint from each image associated with a mailpiece, which signature is a logical identifier for the mailpiece, and in recording the signature associated with the mailpiece in a memory in correspondence with sorting information, and, during a second mailpiece sorting pass, comprises forming a digital image of said surface of each mailpiece again in order to derive a current digital signature associated with the mailpiece, and in searching through the signatures recorded in the first sorting pass for a match with said current signature in order to retrieve the sorting information by association.

2. Discussion of the Background Art

Such a method is known from French Patent Document FR-2 841 673. With that method, it is no longer necessary to affix Id tags constituted by identification codes or time stamps on the surfaces of the mailpieces. The mailpieces are identified by means of respective "virtual" codes that offer the advantage of obviating the need to use bar code printers and thus of significantly reducing the operating and maintenance costs for postal sorting equipment.

In that known method, each digital signature comprises a first component or "image component" representative of physical characteristics of the digital image of the mailpiece corresponding to a second component or "postal component" indicating at least one spatial position of the information blocks present in the image of the mailpiece. In particular, the image component is formed by "global" attributes that are representative of overall physical characteristics taken from the entire set of picture elements (pixels) of the digital image of the mailpiece. The image component is also formed of second attributes or "local" attributes that are representative of local physical characteristics taken from distinct portions of a grid applied over the image of the mailpiece (or of a plurality of different grids).

In practice, when searching for a match between a current signature and a candidate signature recorded in a signature database for the purpose of retrieving sorting information, firstly the respective image components of the signatures are compared and then the respective postal components of the signatures are compared.

When batches of mailpieces coming from bulk senders or "bulk mailers" are to be sorted by using such virtual identification codes or signatures, the problem arises that, overall, the image components (global and local attributes) of the signatures associated with the mailpieces from the same sender cannot serve to discriminate between the signatures. The mailpieces coming from the same bulk sender are generally identical graphically: same type of envelope, same logo printed on the envelope, same sender address block, same position of the recipient address block, etc. Therefore, in practice, it is possible to distinguish between two signatures of mailpieces from the same bulk sender only by the contents of their respective recipient address blocks.

However, in forming signatures, it is not impossible that situations might arise in which the data processing system identifies a sender address block instead of a recipient address block. As a result, when searching through the candidate signatures associated with mailpieces from the same sender, it is possible that a match might be found between two signatures that have the same image component and that, in addition, have postal components that are identical due to the fact that they both erroneously identify sender address blocks instead of recipient address blocks.

In such a situation, an increase in signature matching errors can be observed when searching for matches. Such matching errors naturally give rise to errors in directing the mailpieces to the sorting outlets, and thus to additional costs for the mail handling performed with a view to delivering the mail.

SUMMARY OF THE INVENTION

An object of the invention is thus to propose a method of processing mailpieces that is more robust and that makes it possible to reduce the above-indicated matching errors, more particularly in situations in which the mailpieces to be sorted come from bulk senders and thus have very great graphical similitude.

To this end, the invention provides a method of processing mailpieces, which method, during a first mailpiece sorting pass, comprises forming a digital image of the surface of each mailpiece that bears information blocks, in deriving a digital signature from each image associated with a mailpiece, which signature is a logical identifier for the mailpiece, and in recording the signature associated with the mailpiece in a memory in correspondence with sorting information, and, during a second mailpiece sorting pass, comprises forming a digital image of said surface of each mailpiece again in order to derive a current digital signature associated with the mailpiece, and in searching through the signatures recorded in the first sorting pass for a match with said current signature in order to retrieve the sorting information by association, said method being characterized in that it further comprises the following steps:

grouping together the signatures into signature categories or graphical classes on the basis of a certain criterion of graphical similitude so as to compute a mean signature value for each graphical class;

analyzing, for each graphical class in question, activity of the mean signature value for the purpose of detecting significant activity of an information block in the digital images; and using the results of this activity detection for the purpose of searching for a match.

The basic idea of the invention is thus to classify the successive signatures on the basis of graphical models of signatures, which models are consolidated in real time on the fly so as to reflect, through each model, the unchanging graphical appearance of the images of the mailpieces whose signatures come under the model in question. The analysis of activity (or low-frequency change) that is performed each time the model is consolidated or updated when a new signature is put into the graphical class corresponding to said signature model makes it possible to reveal the position of the recipient address block in the images of the mailpieces because the recipient postal address block is probably the block that presents the most significant low-frequency activity, unlike the other information blocks that are normally stable when the mailpieces are from the same bulk sender.

The method of the invention may present the following features:

- the signatures are grouped together into graphical classes on the basis of a certain criterion of graphical similitude of their image components for the purpose of computing a mean value for the image components of the signatures coming under the graphical class in question;
- the activity of the mean value of the image component is analyzed for the purpose of detecting significant activity of an information block in the digital images;
- the results of this detection are used for the purpose of comparing the postal components of the signatures;
- global attributes and local attributes of the signatures are used to establish signature similarity.
- thresholding of the normalized vector distance is performed on the global attributes so as to establish said similarity;
- a correlation coefficient is computed on the local attributes so as to establish said similarity;
- a topological analysis method of the "K-means" type is used to analyze the activity of the local attributes of the image component; and
- the graphical classes are generated on the fly in the second sorting pass on the basis of the successive current signatures.

The method of the invention can be implemented with any type of mailpiece such as letters, or flat articles of small or large format. The method of the invention is also applicable to sorting parcels and other articles identified by virtual identification codes.

BRIEF DESCRIPTION OF THE DRAWINGS

An implementation of the method of the invention is described in more detail below with reference to the drawings. This description is given merely by way of example, the example being given by way of indication and in no way limiting the invention. In the drawings:

FIG. 1 is a highly diagrammatic view of a mailpiece bearing a plurality of information blocks;

FIG. 2 is a highly diagrammatic view of a sorting machine for implementing the method of the invention;

FIG. 3 is a flow chart showing how a known sorting method proceeds during a first sorting pass;

FIG. 4 is a highly diagrammatic view showing how the image component of the signature of a mailpiece is extracted;

FIG. 5 is a highly diagrammatic view showing how the postal component of the signature of a mailpiece is extracted;

FIG. 6 is a flow chart showing how a first implementation of the method of the invention proceeds during a second sorting pass;

FIG. 7 shows in detail the signature classification step in the method of the invention;

FIG. 8 shows how the image components are compared during the signature classification in the method of the invention;

FIG. 9 shows an example of updating the image components of the graphical classes in the method of the invention;

FIG. 10 shows in detail the step of modifying the postal component of the current mailpiece on the basis of the image component of the corresponding graphical class;

FIG. 11 shows in detail the step of modifying the postal component of the current mailpiece on the basis of the postal component of the corresponding graphical class;

FIG. 12 is a flow chart showing how a second implementation of the method of the invention proceeds during a second sorting pass; and FIG. 13 shows the principle of reducing the exploration space by means of a prediction mechanism.

In the method of the invention, mailpieces such as letters, flat articles or "flats" of small or large format, with wrappers made of paper or of plastics materials, and any other articles to be sorted automatically are identified by digital signatures that are derived from images of the surfaces of the mailpieces that generally bear recipient postal address blocks. Such a digital signature or "image signature" thus serves to identify a mailpiece unambiguously instead of said mailpiece being identified by a bar code time stamp or Id tag in an automatic postal sorting machine. The term "machine" is used to designate, in the broadest sense, postal sorting equipment installed on one or more postal sorting sites optionally including video-coders.

DETAILED DESCRIPTION OF THE PREFERRED EMBODIMENTS

Forming the Digital Signatures

FIG. 1 shows a mailpiece P whose surface bears, for example, a first information block AD that corresponds to the postal delivery address or "recipient address", an information block AE that corresponds to a sender address, and an information block L that can take the form of a graphical logo that corresponds to other additional textual information such as an advertising slogan printed by the sender.

FIG. 2 is a highly diagrammatic view of a postal sorting machine 1 that conventionally comprises: a feed inlet 2 with a loading zone for loading mailpieces P and an unstacker for putting the mailpieces on edge in series; a digital camera 3 for forming an image of the surface of each mailpiece that bears the various above-mentioned information blocks; and a bucket carrousel 4 that directs the mailpieces to sorting outlets 5. Each sorting outlet can be equipped with a plurality of sorting outlet bins (typically a front bin and a rear bin) or with a compartmented sorting outlet bin, without going beyond the ambit of the invention.

FIG. 2 also shows a data-processing system referenced 6 for postal address recognition by Optical Character Recognition (OCR). Said data-processing system is associated with a video coding system 7 as is well known. In accordance with the invention, the system 6 is also arranged to derive a digital signature from the digital image of a mailpiece that is formed by the camera 3.

FIG. 2 also shows a system referenced 9 that is analogous to the system 6 but that is part of another sorting machine 10, said system 9 being connected to the system 6 for communication purposes, e.g. via a telecommunications network 8 for applying the method of the invention to a sorting process made up of a plurality of sorting passes through a plurality of sorting machines.

FIG. 3 is a highly diagrammatic view showing how digital signatures are generated during a first sorting pass through the machine 1. In an initial step 11, mailpieces P are injected into the sorting machine 1 via the feed inlet 2. The mailpieces P are unstacked and conveyed in series and on edge to the digital camera 3.

In step 12, a digital image is formed of the surface of the current mailpiece that can bear the various information blocks shown in FIG. 1, e.g. AE, AD, and L.

In step 13, the system 6 undertakes automatic recognition of the delivery address by OCR, based on the image, and, at the same time, derives therefrom a digital signature V_Id attributed to the mailpiece.

In step 14, if the postal address information is recognized unambiguously in step 13, the address data resulting from the OCR address recognition is recorded in a memory in step 16 in correspondence with the digital signature V_Id of the mailpiece.

If, in step 13, the address is not fully recognized by the OCR, i.e. if the OCR gives ambiguous address information, or indeed no result, then, in step 15, the image of the mailpiece is transmitted to the video coding system 7 for having the address information extracted by a video coding operator, whereupon the address information obtained by video-coding in step 15 is recorded in step 16 in correspondence with the signature obtained in step 13.

In FIG. 3, the block referenced 17 represents a database DBref in which, for each mailpiece, the digital signature V_Id and sorting data (including the address information) of the mailpiece recognized by OCR or by video-coding during the first sorting pass are recorded in correspondence.

Step 18 corresponds to the process of conveying the mailpiece from the camera 3 to the sorting outlets of the machine.

FIGS. 4 and 5 show the components of a signature of the invention in more detail. FIG. 4 also shows the digital image of a mailpiece P, which is generally a gray-scale digital image, with the information blocks AD, AE, and L.

A first component of the signature of the invention is referred to as an "image component" Ci which is representative of the physical characteristics of the image. For example, this image component is extracted by statistically analyzing the luminance of the pixels of the digital image which has previously been subjected to a succession of filtering operations lowering the level of resolution of the image in order to reduce the processing time required for the statistical analysis, and in order to have contents of the low-frequency type which are relatively insensitive to fluctuations in luminance during multiple acquisitions. The luminance of a pixel of the image corresponds to the gray scale value of the pixel.

On the basis of the low-resolution digital image of a mailpiece, the system 6 uses computation to extract global attributes that are representative of overall physical characteristics of the image, such as height and width of the mailpiece, mean luminance of the pixels of the digital image, standard deviation, and entropy of the luminance values.

It is also possible to use computation to extract local attributes representative of local physical characteristics of the image that are taken from distinct portions of the digital image. FIG. 4 shows the digital image of the mailpiece P as subdivided into a plurality of distinct portions B11, B'45 resulting from various grids M1, M2, M3, M4, M5 being applied over the digital image. The grid M1 defines 3×3 distinct portions in this example. The grid M5 defines 8×10 distinct portions. The number of distinct portions in a grid and the number of grids can be a parameter in the statistical analysis applied to the digital image for the purpose of extracting the image component Ci of the signature. On the basis of each portion such as B11 and B'45 of the digital image resulting from a grid such as M1 or M3, it is possible to extract local attributes such as the mean luminance value of the pixels in this portion of the digital image, the standard deviation, and the entropy of the luminance values in this portion of the digital image. These local attributes contain discriminatory information, and the more varied the mailpieces, the more discriminatory the information. The entire set of the global and local attributes extracted for a digital image thus constitute the image component Ci of the signature.

FIG. 5 shows a "postal component" Cp of the signature that indicates at least the spatial positions of the information blocks such as AD, AE and L in an image of a mailpiece. An OCR system conventionally used in a postal sorting machine is capable of delivering data indicating the spatial positions of blocks of textual information detected in the digital image. Such position-indicating data can be constituted by the spatial and angular positioning coordinates of the rectangular zone forming each information block. An OCR system is also suitable for delivering a textual description of each information block detected in the digital image. For example, a textual description of an information block such as AD can consist in an indication of the number of rows of characters detected in the information block, the number of words detected in each row of characters, or the number of characters detected in each word of each row of characters. FIG. 5 shows an example of a textual description of the information block AD constituting the postal component Cp of the signature of a mailpiece:

"BLOCK #0/3", designated by 33, references information block 0 from among the three information blocks detected in the digital image;

"HN", designated by 33', is data indicating the angular positioning of information block 0 in the digital image;

"(0684 0626 0895 0756)" designated by 33" are data items representative of the spatial co-ordinates of information block 0 in the digital image;

"NbrRows 4", designated by 33''', indicates that the information block 0 contains four rows of characters;

"Row #0", designated by 34, references the first row of characters detected in information block 0;

"NbrWords 03", designated by 35, is data indicating that three words have been detected in the first row of characters;

"NbrCharPerWord 01 06 04", designated by 36, are data items indicating that the three words of the first row of characters contain 1, 6, and 4 characters, respectively;

"char #0 (1 007 I 009 i 019)", designated by 37, are data items indicating that, for the first character of the first row of characters, the OCR has identified three candidate characters, respectively 1, I, and i, with respective resemblance distances of 007, 009, and 019;

"char #1 (L 008 E 009 D 057)", designated by 38, are data items indicating that for the second character of the first row of characters, the OCR has identified three candidate characters, respectively L, E, and D, with respective resemblance distances of 008, 009, and 057;

and so on for the other characters of the first row of characters, given that a value 0 for the resemblance distance is the shortest distance, i.e. it represents the smallest departure from the ideal character.

Generating a signature thus stems from the idea that a digital image of a mailpiece is an interpretable two-dimensional signal whose contents can be understood both physically and symbolically. Because the signature of a mailpiece is made up of two complementary components Ci and Cp that are not mutually correlated (i.e. that are independent from each other).

Searching for Signature Matches in the Second Sorting Pass

FIG. 6 shows the process of managing the signatures during a second sorting pass performed after the first sorting pass shown in FIG. 3. The mailpieces sorted in the first pass are thus fed back into the sorting machine 1 and go past the camera 3 again in series and on edge. In step 41, a digital image is formed again of the surface of a current mailpiece that bears information blocks such as the recipient address block AD, and, in step 42, a current signature V_IdC is derived again for the current mailpiece as indicated above. The current signature V_IdC comprises an image component CiC and a postal component CpC.

Then, in step 46, the image and postal components CiC and CpC of the current signature V_IdC are compared with the image and postal components Ci, Cp of the signatures recorded in the database DBref 17 for the purpose of detecting any match.

This comparison can begin with a comparison of the respective global attributes of the image components, which comparison includes thresholding of the absolute values of the variations over each global attribute so as to perform initial filtering from among the signatures recorded in the database 17. This filtering makes it possible to eliminate the signatures that are very dissimilar from the current signature, and to retain a small number of candidate signatures only for continuing the comparison.

Then the local attributes of the image components of said candidate signatures are compared, which comparison can further reduce the number of candidate signatures in the database 17. This comparison can be based firstly on computing a moving normalized correlation coefficient between the corresponding histograms in the current signature and in the respective candidate signatures, thereby making it possible to be unaffected by any variations in luminance between the two digital images being compared, and then on computing a normalized correlation coefficient per type of attribute, between the other local attributes in the current signature and in the respective candidate signatures, thereby making it possible to be unaffected by problems of normalization due to the difference in variability of each local attribute. The candidate signatures are then sorted in decreasing order of resemblance on the basis of the correlation coefficients and a fixed number of most similar candidate signatures are retained.

Comparison between the postal components Cp of the signatures begins by measuring the resemblance of the data indicating the positions of the information blocks. This second comparison advantageously uses a second criterion that is decorrelated from the comparison criterion for the comparison of the image components. These candidate signatures can then be sorted in decreasing order on the basis of a measurement of resemblance between the textual descriptions of the information blocks.

Naturally, the comparison of the postal components can be performed before the comparison of the image components, or indeed the postal and image component comparisons can be performed simultaneously without going beyond the scope of the invention.

If, in step 46, it is not possible to detect a match, then, in step 47, the mailpiece is directed to a reject outlet for manual sorting, for example. If, in step 46, a match is detected, the sorting and address data for the current mailpiece is retrieved from the database 17, and the current mailpiece is directed automatically to another sorting outlet corresponding to step 48.

Categorizing the Signatures

In the method of the invention, prior to step 46 in FIG. 6, a reliability-enhancing process is performed firstly for increasing the reliability of the current signature, and secondly for increasing the reliability of the signatures of the database DBref by means of classifying said signatures. This reliability enhancement makes it possible, during the search for a match, to adjust the postal components of the signatures to be compared so as to avoid matching errors.

The principle of this classification is firstly to create a sort of dictionary in which categories or "graphical classes" CG of signatures are listed.

Each graphical class is modeled by an image component CiCG and by a postal component CpCG similar to a signature component as described above.

In accordance with the invention, this dictionary is updatable in real time in that the image and postal components of the graphical classes are updated on the fly, i.e. as the process proceeds, a signature is attributed to a graphical class, and said graphical class is therefore consolidated. This updating on the fly does not require any deferred processing: it is executed in real time. In addition, with such updating on the fly, it is not necessary to transmit the dictionary for subsequent sorting in a remote sorting centre.

As can be understood, in accordance with an important characteristic of the method of the invention, each time a graphical category is updated, a mean value is computed for the image component (consolidation stage), and the low-frequency activity of said mean value is analyzed so as to assess the position of the recipient address block, thereby making it possible, on searching for a match in step 46, to use the appropriate information block when comparing the postal components of the signatures. The term "low-frequency analysis" is used to mean analysis of the changes in low-resolution images.

In step 43, a process of classifying the current signature VidC is performed, i.e. the image component CiC of the current signature is compared with the image component CiCG of the graphical classes present in the dictionary 19 so as to determine the graphical class CGx of the dictionary that is most similar to the current signature. More particularly, in the method of the invention, the local and global attributes of the image components CiC and CiCG are compared so as to identify a membership graphical class CGx at the end of step 43. If no graphical class of the dictionary corresponds to the current signature, a new graphical class CGx is created.

FIGS. 7 and 8 show more particularly the process of comparing the image components so as to achieve this classification. Those figures are described further on in the description below.

In step 44, which follows the classification step, an analysis of the low-frequency activity of the image component of the graphical class CGx is performed so as to detect any significant low-frequency activity of an information block in the digital images associated with the signatures coming under this graphical class. This step 44 is described more particularly with reference to FIG. 9.

In step 45 reliability-enhancing processing is performed for the current signature on the basis of the results of the activity analysis at step 44 that is described in more detail with reference to FIGS. 10 and 11. At the end of step 45, the postal components of the current signature and of the graphical class CGx can be adjusted. These adjustments make it possible to avoid matching errors in the step 46 for searching for a match with the signatures recorded in the database 17.

After the step 46 for searching for a match, at 50, consolidation of the postal component of the graphical class CGx identified for the current mailpiece is performed only if, at the preceding step 49, the situation is one in which a certain "strong postal criterion" is verified. The term "strong postal criterion" is used to mean a situation in which the postal components CpC of the current signature and of a matching signature identified in step 46 are similar (e.g.: same identification of the recipient address block, said number of rows of characters in that block, same number of words per row in that block, etc.).

The process of steps 41 to 50 in FIG. 6 is repeated in this way for the successive current mailpieces processed in the second sorting pass.

FIGS. 7 and 8 thus show in more detail the step 43 for classifying the signatures. On initializing the process, i.e. for the first mailpiece of the second sorting pass, the dictionary or database 19 of the graphical classes CG is normally empty. In order to satisfy real-time processing constraints, it is possible to limit the number of graphical classes CG kept in the dictionary to a certain value NbrMaxCG that can be adjustable. The value NbrMaxCG can, for example, be conditioned by "a priori" information given by the machine operator and indicating the non-uniformity of the mailpieces to be processed. In general, for two-pass sorting of mailpieces coming from a plurality of bulk senders, it is possible to set the value NbrMaxCG to about 100. A value NbrMaxCG equal to 100 corresponds to a batch of mailpieces that present low uniformity, i.e. with a number of successive mailpieces belonging to the same sender that is relatively low.

In FIG. 7, in step 51, the current image component CiC of the current signature V_IdC is compared with the image component CiCG of each graphical class recorded in the database 19 so as to detect a certain amount of similarity. The comparison of the image components is performed in the same way as described above for step 46. In particular, the comparison is performed firstly on the global attributes and then on the local attributes of the image components CiC and CiCG. The global and local attributes are obtained on the basis of a low-resolution image of the mailpiece, e.g. of resolution 0.25 pixels per millimeter (mm).

FIG. 8 shows more particularly this step 51 of comparing the global attributes (51a) and the local attributes (51b) of the image components CiC and CiCG. As global attributes, FIG. 8 shows: the height H of the mailpiece, the width L, the mean luminance value I of the pixels of the digital image, the standard deviation E, and the entropy T of the luminance values. On the left of FIG. 8, in the box 52, a first vector (one-column table) shows the values H, L, I, E, T for CiC, and a few other vectors show the similar values for the CiCGs associated with the classes CG1, CG2, . . . , $CG_N$.

For the purpose of pre-selecting the candidate graphical classes CGi, firstly each global attribute of the image component CiC is compared with the corresponding attribute of one of the image components CG1, CG2, . . . , $CG_N$. For example, in order to determine whether the graphical class CG1 is a candidate, the difference between the heights H of CiC and of CG1 is compared with a threshold τ1, the differences between the widths L of CIC and of CG1 is compared with a threshold τ2 . . . , it being possible for the thresholds τ1, τ2 . . . to be different, and, if, for all of the attributes, the difference is less than the threshold, then CG1 is the candidate.

A distance (normalized vector distance, designated in FIG. 8 by NVD) is then computed between the vector HLIET for CiC and the vector HLIET of each candidate graphical class. The normalized vector distances NVDs are also compared with a threshold (which can be adjustable) in step 53 so as to determine the graphical class(es) CGi that are most similar to the current signature.

On the basis of the graphical class(es) CGi that are pre-selected in this way, the local attributes of the image component CiCG of said graphical classes are compared with the local attributes of the image component CiC of the current signature. FIG. 8 shows the local attributes in the box 54 by triplets of 4×4 matrices (thus resulting from application of a 4×4 grid for generating the signature) assigned respectively to the mean luminance values I of pixels, the standard deviation E, and the entropy T of the luminance values.

The CiC local attributes are correlated with the CiCG local attributes of each graphical class selected at 53, and the correlation coefficient CC that is computed (−1≦CC≦1) and that is the highest is chosen at the end of step 51. Naturally, it is possible to use various sizes of grid in computing the correlation values.

Then, in step 55, said correlation coefficient CC is compared with a threshold (which is optionally adjustable) so as to undertake updating of the dictionary 19 of the graphical classes. Thus, if, at step 55, the correlation coefficient CC is less than the threshold, then, in step 56, a new graphical class CGx is added to the dictionary 19, and the number of graphical classes kept in the dictionary is updated (where applicable, a graphical class can be deleted in the event that the value NbrMaxCG is exceeded, the graphical class deleted from the dictionary being the one that is least used during a reference period, for example). The components CiCG and CpCG of the new graphical class CGx are initialized with the components CiC and CpC of the current signature used in step 48.

If, in step 55, the correlation coefficient CC is higher than or equal to the threshold, then, at 57, the counter for counting use of the graphical class CGx is updated, and said graphical class CGx is updated.

Adjusting the threshold of step 55 makes it possible to adjust the level of similitude required for the categorization. In practice, it is necessary to find a threshold that makes it possible to bring together the signatures of mailpieces that have considerable graphical similitude while preventing mailpieces from the same sender and having the same graphical appearance from being able to result in a plurality of graphical classes being created. At the end of step 43, a graphical class CGx is thus identified as being similar to the current signature VidC.

FIG. 9 shows a set of local attributes of the image component of the graphical class CGx that serve for low-frequency activity analysis in step 44 in FIG. 6. These local attributes are standard deviation values on: mean luminance I, standard deviation E and entropy T. These values relate to distinct zones of a certain grid applied to the image of a mailpiece as explained above. By way of example, FIG. 9 shows application of a 5×5 grid over the image, giving 3 mtrices 60, each having 25 standard deviation values. In order to compute each standard deviation value in a matrix 155, E55, and T55, a mean is taken that is consolidated with the corresponding value of the local attribute of the current signature. It can thus be considered that, by computing this standard deviation, it is possible to compute a mean signature value for the graphical class CGx. The three matrices I55, E55, and T55 can be merged into one matrix G55, e.g. using a normalized principal-components analysis (NPCA), well known to the person skilled in the art. This matrix G is a sort of "changes grid" that shows the low-frequency changes, i.e. the changes that occur each time the matrix G is consolidated.

At 62, a summary of the matrix G is shown in which the matrix elements are distributed into three classes by a topological method such as a non-supervised method of the "K-means" type based on measuring proximity in space of the observations. The "K-means" method makes it possible, in the matrix G, to isolate matrix elements on the basis of 3 levels: unchanging; changing little; and highly changeable; these levels being shown respectively by white, gray, and black squares. In order to be unaffected by variations related to the mechanical acquisition fluctuations, it is possible not to take account of the squares detected as being "changeable" that are on the edges of the matrix G. It is possible to group the squares together as a function of their relatedness and of their low-frequency activity. It is possible to use a plurality of matrices G having different grids. At the end of step 44, the spatial position of an information block that has the most significant low-frequency activity has normally been detected.

FIG. 10 shows how the result of the low-frequency activity is taken into account in step 45. At 63, if low-frequency activity of a matrix element of a matrix G (or of matrix elements of a plurality of matrices G) has/have been detected by detecting the presence, for example, of a black square (highly changeable block at 62), then, at 64, it is verified whether the position of said square in the matrix G coincides with the position of the information block in the postal component CpC of the current signature that has been chosen as the recipient address block. Whether or not it coincides can be established by a spatial projection of the co-ordinates of the square and of the information block so as to measure a spatial distance and then by comparing said measured distance with a threshold. In the event that such coincidence is detected, the process continues at step 70 in FIG. 11.

If, in step 63, no low-frequency activity has been detected, the method continues at step 70 in FIG. 11.

If, at step 64, no spatial coincidence is detected between the information block identified in the postal component CpC of the current signature and "the block" of the matrix that shows the low-frequency activity that is most significant, then, in step 65, a measurement is taken of the spatial coincidence between this "block" that shows the highest low-frequency activity and all of the other information blocks identified in the postal component CpC of the current signature. If no spatial coincidence with said other information blocks is detected, the process continues at step 70 of FIG. 11.

If, in step 65, a spatial coincidence is detected with one of the other information blocks, then, in step 66, the postal component CpC of the current signature is modified so as to identify said information block as being probably the recipient address block, said block thus being used subsequently in step 46 for searching for signature matching.

As shown in FIG. 11, in step 70, a consolidated measurement is taken on the dispersion of the spatial position of the information block identified as being the recipient address block in the postal components of all of the successive signatures forming the graphical class CGx. This dispersion measurement is in the form of a standard deviation value. If it is detected that the distance measured is greater than a certain threshold, the process continues at step 46 of FIG. 6. This is the situation in which the postal component CpC of the graphical class CGx is not reliable enough due to the fact that the signature postal component that served to generate this graphical class is unstable.

Conversely, if, at step 70, the distance measured is less than said threshold, the process continues at step 71 in which spatial matching is measured between the postal component of the graphical class CGx and the postal component CpC of the current signature. This measurement consists, for example, in computing the difference in position between the center of the information block identified as the recipient address block in the postal component of the current signature and the mean position of the center of the recipient address block of the corresponding graphical class. This measurement is compared with a low threshold and, if said measurement is less than this certain low threshold, the process continues at step 46 of FIG. 6 for searching for signature matching.

If, in step 71, no spatial matching is detected, then the process continues at step 72 in which a search is made to determine whether there exists an information block identified in the postal component CpC of the current signature and for which the distance from the information block identified as being the recipient address block of the postal component of the class CGx is less than the low threshold.

If the answer to step 72 is "yes", the process goes on to step 73 in which the information block is then identified in the postal component CpCG of the graphical class CGx as being probably the recipient address block.

Conversely, if the answer to step 72 is "no", the process continues at step 74 in which the spatial distance is measured between all of the information blocks identified in the postal component CpC of the current signature and the information block identified as being the recipient address block in the postal component of the graphical class CGx. If that distance is greater than a high threshold, the postal component of the class CGx is re-initialized (Reset) in step 75 in the dictionary 19.

In FIG. 12, another implementation of the method of the invention is shown that differs from the implementation shown in FIG. 6 at step 42. In the step 80 that follows the step 42 in which a current signature VidC is generated, the current signature is classified by means of a dictionary 19 as explained above. A similar graphical class CGx is retrieved. The postal component CpC of the current signature is, where appropriate, modified, on the basis of the image component CiCG of the graphical class CGx, and, where appropriate, the postal component CpCG of the graphical class CGx is modified.

In step 81, candidate signatures are retrieved from the signature database 17 using a sequence prediction mechanism that is known from French Patent Document FR 2 883 943. Step 81 serves to limit the exploration space in the database 17 by making advantageous use of account being taken of a certain sequencing (pass order) for the mailpieces in the first sorting pass that is repeated in the second sorting pass. This limited exploration space is constituted by candidate signatures.

In step 82, each candidate signature is classified in the dictionary 19 of graphical classes using the above-defined classification mechanism. At the end of step 82, one graphical class CGy has been identified for each candidate signature.

If, in step 83, it is detected that the graphical class CGx of the current signature is identical to the graphical class CGy of the candidate signature in question, then, in step 84, the postal component Cp of the candidate signature is modified using the mechanism described with reference to FIGS. 10 and 11 so as to reposition the recipient postal address properly in the postal component of the candidate signature. Then, in step 85, where appropriate, the postal component of the candidate signature is modified as a function of the postal component of the graphical class CGx as described with reference to FIG. 11. The method then continues at step 46 of FIG. 6. It should be understood that the process from steps 82 to 85 is repeated for each candidate signature at the end of step 81.

If, in step 83, no common graphical class has been detected that is common to the current signature and to the candidate signatures, the process continues directly at step 46 of FIG. 6.

The method of limiting the exploration space of step 81 is based on the idea of attributing a chronological serial number SN to each mailpiece in the first sorting pass, which number is recorded in a memory in correspondence with the signature of the mailpiece in the database 17. Each chronological serial number SN can, for example, be constituted by the juxtaposition of a sorting center number assigned to the sorting center in which the sorting machine 1 is located, of a sorting machine number assigned to the sorting machine in which the mailpiece is sorted, of a sorting outlet bin number assigned to the sorting outlet bin to which the mailpiece is directed, and of a chronological index assigned to the mailpiece. In practice, said index is, for example, the value of a counter which is associated with a sorting outlet bin, which is initialized when a first mailpiece is directed to the bin, and which is incremented by one unit every time a new mailpiece is directed into the bin. In this manner, a serial number SN that is unique is assigned to each mailpiece.

At the end of the first sorting pass, the signatures are grouped together in a sequence in the database 17. For example, the signatures are grouped together and sequenced by sorting center, by machine, and by bin in the order in which the mailpieces are stored in each sorting outlet bin. As described in detail below, the sequences of contiguous signatures in the database 17 constitute identifiable segments.

During the second sorting pass, at the end of step 80 in FIG. 12, a pass index PI (ranging from 1 to n) is attributed to the signature V_IdC of the current mailpiece. Whereupon, an estimated chronological serial number SN is computed for the current signature by linear approximation as described in French Patent Document FR-2 883 943. This computation is performed by linear approximation on the basis of a series of chronological serial numbers stored in the memory. On a graph in FIG. 13, pass indices PI for mailpieces 374 to 405 are plotted along the x-axis, those indices corresponding respectively to the second pass of mailpieces 374 to 405 for which digital signatures VId have been extracted in step 80. Examples of chronological serial numbers SNs assigned to mailpieces in the first pass (mailpieces stored in bins numbered "76" and "86" in this example) are plotted up the y-axis. The computation by linear approximation consists, on the basis of a series of mailpiece pass index and chronological serial number (PI,SN) pairs shown by crosses in FIG. 13, in determining by an equation system the coefficients a, b of a straight line (SN=a.PI+b) such as D1 or D2 so as then to be able to compute a chronological serial number SN placed on said straight line as a function of a current pass index PI.

In addition, the implementation of the method of the invention that is shown in FIG. 12 makes advantageous use of the above-described prediction mechanism during the consolidation step 50. In step 50, the postal component of the graphical class CGx identified for the current mailpiece is consolidated if, in step 49, the situation is a "strong postal criterion" situation, as explained above, and if, in addition, the chronological serial number of the matching signature determined in step 46 corresponds to the estimated chronological serial number SN.

The invention claimed is:

1. A method of processing mailpieces comprising the steps of:

forming, during a first mailpiece sorting pass, a digital image of the surface of each mailpiece that bears information blocks, deriving a digital signature from each image associated with a mailpiece, wherein said digital signature is a logical identifier for the mailpiece having an image component representative of physical characteristics of the digital image of the mailpiece and a postal component representative of at least a spatial position of an information block present in the image of the mailpiece, and recording the signature in a memory in correspondence with sorting information; and forming, during a second mailpiece sorting pass, a digital image of a surface of a current mailpiece in order to derive a current digital signature associated with the mailpiece, wherein said method further comprises the following steps:

a) comparing said current signature to graphical classes of signatures modeling different categories of mailpiece signatures to detect a candidate graphical class having a certain amount of similarity with said current signature, wherein each graphical class of signatures has an image component corresponding to a consolidated mean value of image components for successive similar current signatures derived in the second sorting pass;

b) computing standard deviation values from said current signature image component and said candidate graphical class image component and determining a spatial position of a recipient address information block that has a significant low-frequency activity;

c) enhancing reliability of said current signature postal component using said determined spatial position of said recipient address information block that has a significant low-frequency activity; and d) searching through the signatures recorded in the first sorting pass for a match with said enhanced current signature in order to retrieve sorting information by association.

2. A method according to claim 1, in which the comparison between said current signature and said graphical class is performed on "global" first attributes of said current signature image component representative of overall physical characteristics taken from all of the pixels of the image of said current mailpiece and "local" second attributes of said current signature image component representative of local physical characteristics taken from distinct portions of a grid applied over the image of said current mailpiece.

3. A method according to claim 2, in which thresholding of the normalized vector distance is performed on the global attributes so as to establish said similarity.

4. A method according to claim 2, in which a correlation coefficient is computed on the local attributes so as to establish said similarity.

5. A method according to claim 2, in which a topological analysis method of the "K-means" type is used to analyze the activity of the local attributes of the image component.

* * * * *